(12) United States Patent
Suzuki et al.

(10) Patent No.: US 7,607,163 B2
(45) Date of Patent: Oct. 20, 2009

(54) VIDEO PLAYING SYSTEM, VIDEO PLAYING APPARATUS, CONTROL METHOD FOR PLAYING VIDEO, STORAGE MEDIUM STORING PROGRAM FOR PLAYING VIDEO

(75) Inventors: Michitoshi Suzuki, Shinjuku-ku (JP); Shinya Taguchi, Shinjuku-ku (JP); Yutaka Egawa, Shinjuku-ku (JP); Masakazu Ogawa, Shinjuku-ku (JP); Eisuke Kanno, Shinjuku-ku (JP); Shunsuke Nagatani, Shinjuku-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 512 days.

(21) Appl. No.: 11/319,501

(22) Filed: Dec. 29, 2005

(65) Prior Publication Data

US 2007/0067795 A1   Mar. 22, 2007

(30) Foreign Application Priority Data

Sep. 20, 2005   (JP)   ............................. 2005-272638

(51) Int. Cl.
*H04N 7/173* (2006.01)
(52) U.S. Cl. .................. 725/141; 100/131; 100/132; 100/133; 100/134
(58) Field of Classification Search ................. 725/1–9, 725/135, 143, 22
See application file for complete search history.

(56) References Cited

U.S. PATENT DOCUMENTS

| | | | | |
|---|---|---|---|---|
| 5,452,435 | A * | 9/1995 | Malouf et al. ................ | 713/500 |
| 6,731,312 | B2 * | 5/2004 | Robbin ........................ | 715/792 |
| 2002/0013948 | A1 * | 1/2002 | Aguayo et al. ................ | 725/91 |
| 2005/0055710 | A1 * | 3/2005 | Aoki et al. ..................... | 725/32 |
| 2006/0075421 | A1 * | 4/2006 | Roberts et al. ................. | 725/9 |

FOREIGN PATENT DOCUMENTS

JP    A 2004-282731    10/2004

OTHER PUBLICATIONS

Panasonic DVD Player Operating Instations, Model No. DVD-CP72, Copy Right 2002 matsushita Electric Industrial C., Ltd.*

* cited by examiner

*Primary Examiner*—Nick Corsaro
*Assistant Examiner*—Quan M Hua
(74) *Attorney, Agent, or Firm*—Oliff & Berridge, PLC

(57) ABSTRACT

A video playing system, which plays video data divided into a plurality of blocks, includes: a delivery part that delivers video data, a playing part that plays the delivered video data, and a detection part that detects viewing speed of the video data at a start point of a block of interest, at an end point of the block of interest, and at a point between the start point and the end point of the block of interest. When the detected viewing speed satisfies a predetermined condition, information indicating that viewing for the block is completed is generated.

21 Claims, 4 Drawing Sheets

*FIG. 4*

| USER | VIDEO DATA | BLOCK |
|---|---|---|
| aaaa | bbbb | 1 |
| aaaa | bbbb | 2 |
| cccc | dddd | 1 |
| ⋮ | ⋮ | ⋮ |

VIDEO PLAYING SYSTEM, VIDEO PLAYING APPARATUS, CONTROL METHOD FOR PLAYING VIDEO, STORAGE MEDIUM STORING PROGRAM FOR PLAYING VIDEO

This application claims priority under 35 USC 119 from Japanese patent document, 2005-272638, the disclosure of which is incorporated by reference herein.

BACKGROUND OF THE INVENTION

1. Field of the Invention

The present invention relates to a video playing system and a video playing apparatus that plays video data and causes a user to view videos.

2. Description of the Related Art

In recent years, video data are delivered to conduct business in a variety of fields. For example, video data for education are delivered to hold a training session or the like from a remote location or video data of a movie or the like is delivered to allow a user to view the movie. In these applications, for example, in the case of the video data for education, an organizer of the training session desires to confirm whether a trainee has viewed to the entire video data (whether the video data has been played in an unintended state, for example, the trainee has played the video data with a part thereof skipped).

Therefore, for example, a technique is known for delivering video data attached with information equivalent to a time scale. Under this technique, time information of a point when a user starts the operation (such as playing) and time information of a point when the user ends the operation is acquired. Then, using the time information of the start operation and the time information of the end operation it is judged that the section has been played. In the technique described above, when operation by the user is special playback (fast forward, etc.), information at a start point and an end point of the operation is not transmitted.

However, in the technique described above, for example, in the case of a variable viewing speed, when the user increases viewing speed after performing playback operation, processing taking into account a function of an apparatus on a viewing side is not performed.

If it is recognized that fast-forward operation is performed when the viewing speed is increased, for example, when the user holds a training session by performing fast-hearing playback (viewing at speed about 1.5 times as fast as a normal speed), it is inadvertently recognized that the viewing is not performed. Thus, it is impossible to perform judgment on whether viewing a video has been performed.

SUMMARY OF THE INVENTION

According to an aspect of the invention, there is provided a video playing system, in which video data is divided into a plurality of blocks, including a delivery part that delivers video data, a playing part that plays the delivered video data, a detection part that detects viewing speed of the video data at a start point of a block of interest, at an end point of the block of interest, and at a point between the start point and the end point of the block of interest. When the detected viewing speed satisfies a predetermined condition, information indicating that viewing for the block is completed is generated.

BRIEF DESCRIPTION OF THE DRAWINGS

An embodiment of the invention will be described in detail based on the following figures, wherein:

FIG. 4 is a table for explaining an example of playing information held in the video playing system according to the embodiment.

DETAILED DESCRIPTION OF THE INVENTION

Figure 1:
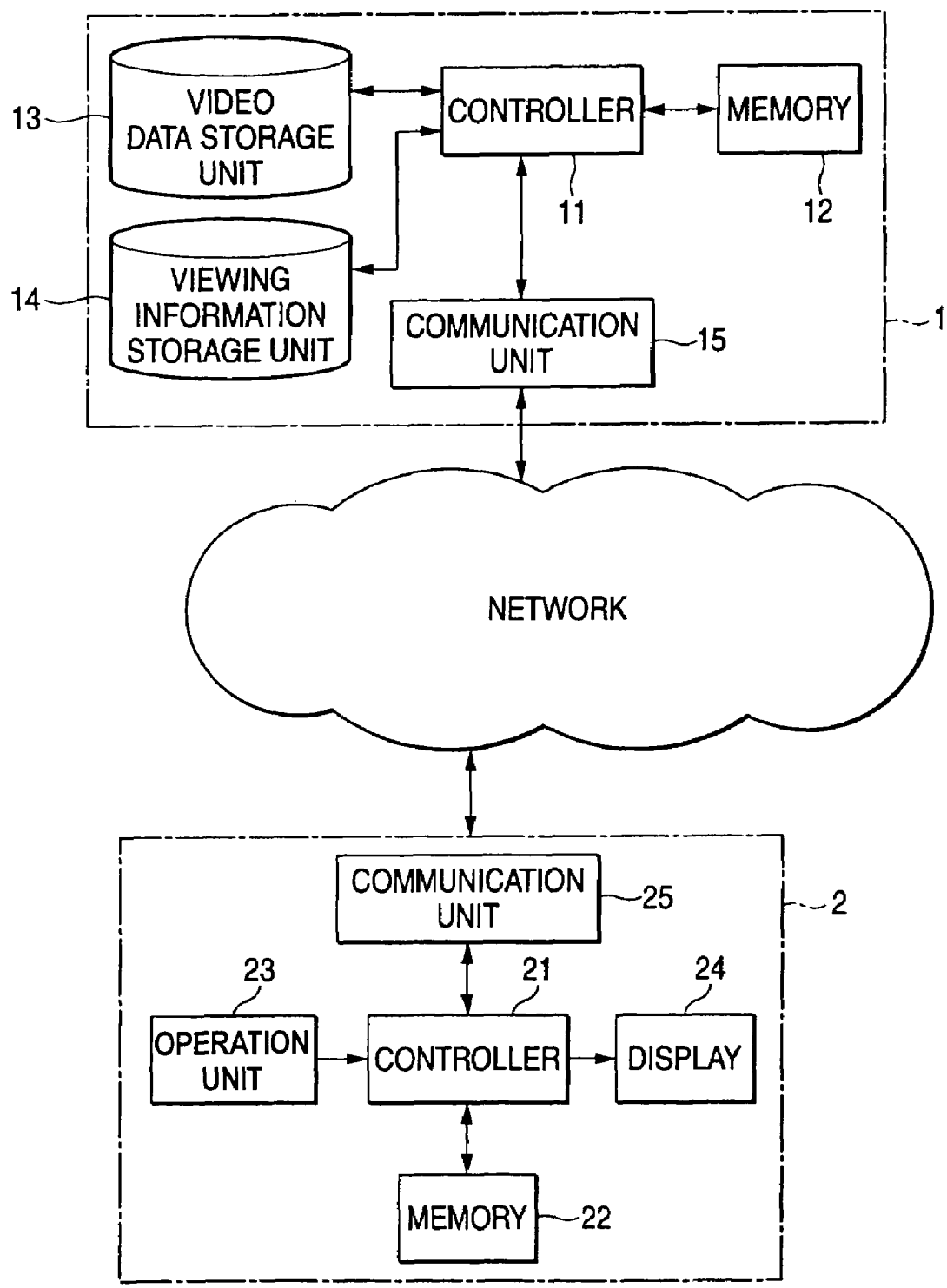
FIG. 1 is a block diagram showing an example of a constitution of a video playing system according to an embodiment of the invention.

An embodiment of the invention will be hereinafter explained with reference to the accompanying drawings. A video playing system according to the embodiment of the invention includes, as shown in FIG. 1, a delivery server 1 and a video playing apparatus 2 serving as a client apparatus. The delivery server 1 and the video playing apparatus 2 are connected to each other via a network. Although only one video playing apparatus 2 is shown in the figure, actually, plural video playing apparatuses 2 may be provided. In that case, the delivery server 1 delivers video data to the respective video playing apparatuses 2.

The delivery server 1 includes, as shown in FIG. 1, a controller 11, a memory 12, a video data storage unit 13, a viewing information storage unit 14, and a communication unit 15. The video playing apparatus 2 includes a controller 21, a memory 22, an operation unit 23, a display 24, and a communication unit 25.

The controller 11 of the delivery server 1 is a Central Processing Unit (CPU) and operates in accordance with a program stored in the memory 12. The controller 11 executes processing for delivering video data stored in the video data storage unit 13. The controller 11 also executes processing for receiving viewing information on a viewing state from the video playing apparatus 2 and storing the viewing information in the viewing information storage unit 14. The processing for the viewing information by the controller 11 will be described in detail later.

The memory 12 includes a storage element such as a Random Access Memory (RAM) or a Read Only Memory (ROM). The memory 12 holds a program that is executed by the controller 11. The memory 12 also operates as a work memory for the controller 11.

Figure 2:
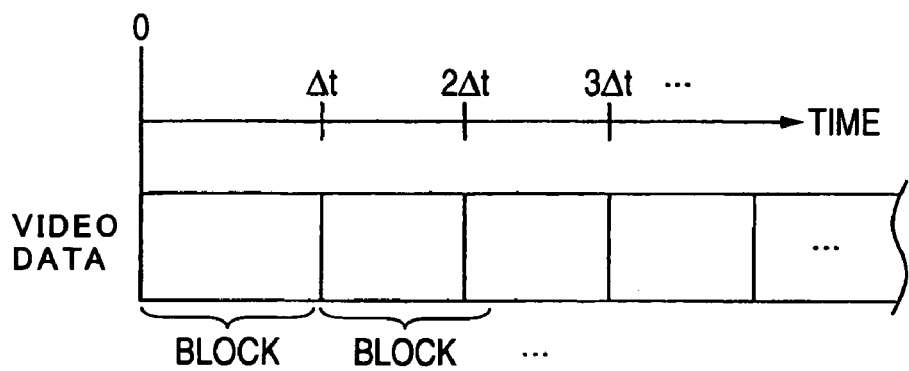
FIG. 2 is a diagram for explaining an example of video data in the video playing system according to the embodiment.

The video data storage unit 13 is a storage device such as a hard disk. The video data storage unit 13 holds at least one video data to be delivered. As shown in FIG. 2, the video data is divided into plural blocks at every predetermined time. In an example shown in FIG. 2, the video data is divided into blocks at every Δt seconds. Δt seconds may be a length of, for example, about several seconds. The video data does not always have to be divided by a fixed time such as Δt seconds and may be divided for each random length.

As an example of block division, when the video data is, for example, Motion Picture Experts Group (MPEG) data, it is possible to divide the video data into blocks as a Packetized Elementary Stream (PES). In this case, it is possible to use stream identifiers (Stream_id) as information for identifying the respective blocks.

Alternatively, MPEG packs maybe used as blocks. In this case, it is possible to use identifiers of the packs as information for identifying the respective blocks.

The viewing information storage unit 14 is a storage device such as a hard disk. The viewing information storage unit 14 stores and holds the viewing information received from the video playing apparatus 2 in association with information for specifying a user of the video playing apparatus 2.

The communication unit 15 is a network interface or the like. The communication unit 15 transmits video data in accordance with an instruction inputted from the controller 11. The communication unit 15 outputs the viewing information received from the video playing apparatus 2 via the network to the controller 11.

The controller 21 of the video playing apparatus 2 is a CPU and operates in accordance with a program stored in the memory 22. The controller 21 accumulates the video data received from the delivery server 1 in the memory 22, decodes the video data accumulated in the memory 22 in accordance with an instruction operation from the user, and outputs to display the video data on the display 24. In this embodiment, the controller 21 acquires information on a playback state of the video data and outputs to transmit the information to the delivery server 1 as viewing information. The processing by the controller 21 will be described in detail later.

The memory 22 includes a storage element such as a RAM or a ROM. The memory 22 holds a program that is executed by the controller 21. The memory 22 also operates as a work memory for the controller 21 and accumulates and holds video data to be played.

The operation unit 23 is a mouse, a keyboard, or the like and outputs content of instruction operation by the user to the controller 21. The display 24 is a display or the like and outputs to display an image in accordance with an instruction inputted from the controller 21.

The communication unit 25 is a network interface or the like and transmits data such as viewing information in accordance with an instruction inputted from the controller 21. The communication unit 25 outputs the video data received from the delivery server 1 via the network to the controller 21.

Figure 3:
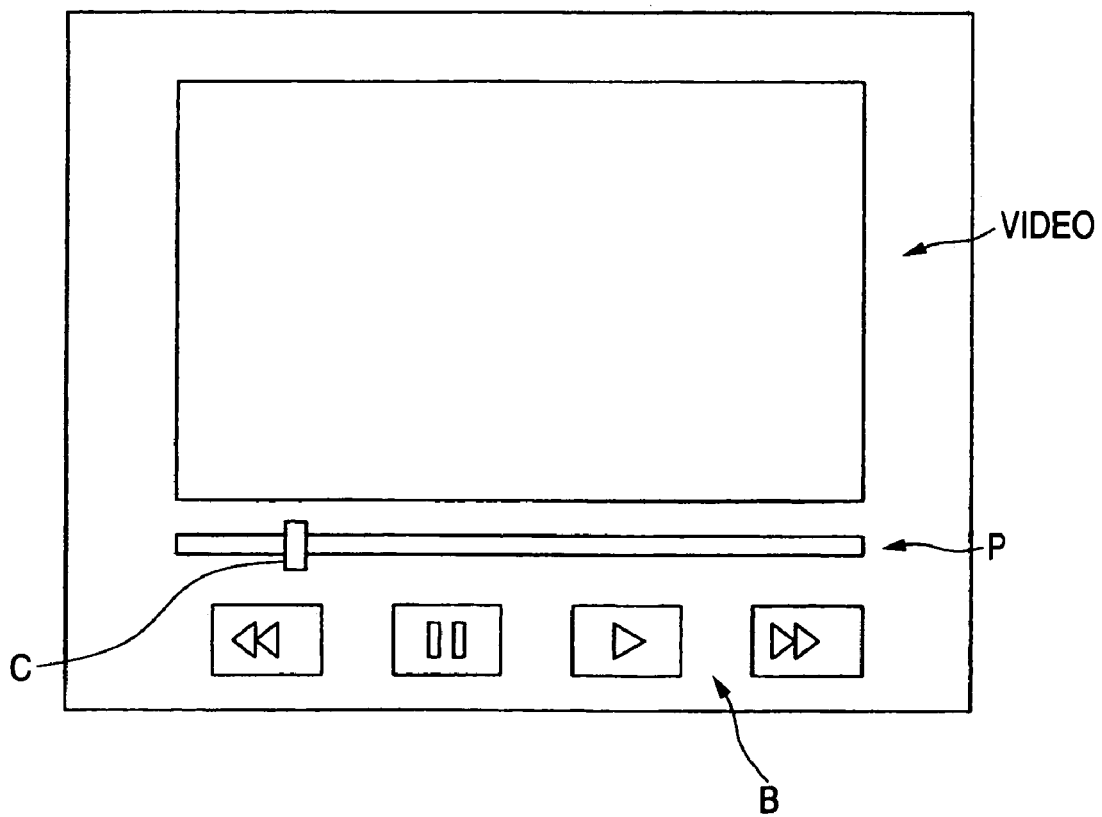
FIG. 3 is a schematic diagram showing an example of a display interface for video data in the video playing system according to the embodiment.
Figure 5:
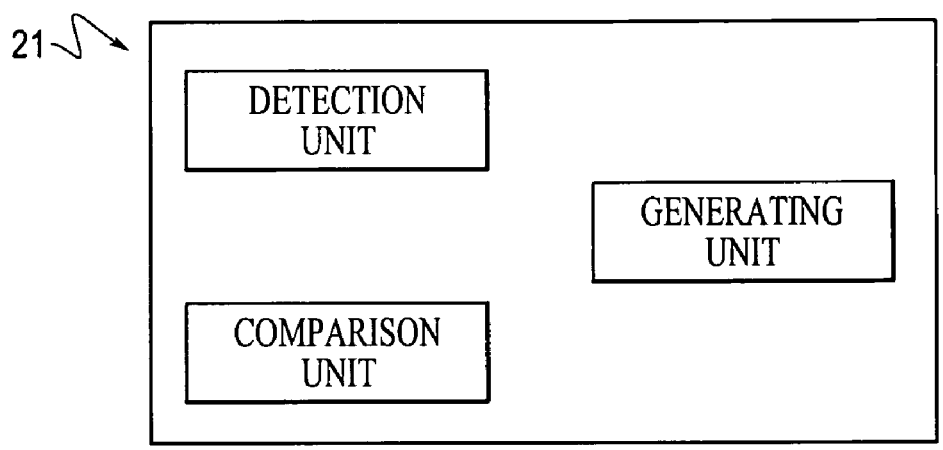
FIG. 5 is block diagram enlarged view of controller 21 from FIG. 1.

First, processing by the controller 21 of the video playing apparatus 2 will be explained. The controller 21 displays an interface screen for controlling playback of video data on the display 24. The interface screen includes, for example, as shown in FIG. 3, a group of buttons (B) for performing instructions for rewinding (viewing in a reverse direction), playback, fast-forward, pause, and the like and a progress bar (P) representing a playing position of the video data. A cursor (C) is displayed on the progress bar. A display position of the cursor is controlled according to the playing position.

For example, when the controller 21 receives video data to be played, the controller 21 accumulates and stores the video data in the memory 22. While applying decoding processing to the video data accumulated in the memory 22 from the top of the video data, the controller 21 displays an image after decoding on the display 24. When delivered video data is, for example, MPEG data, the controller 21 outputs to display an image obtained by decoding respective frame data included in the MPEG data at a viewing speed corresponding to an instruction for rewinding, playback, fast-forward, pause, or the like. The controller 21 moves the cursor of the progress bar to a playing position on the video data.

When the user performs operation for moving the cursor, the controller 21 controls a display position of the video data according to a moving speed and a moving position of the cursor according to the operation. For example, when the user moves the cursor in a forward direction (a direction from the top to the end of the video data) at speed equal to or higher than a normal viewing speed, playback is performed to realize the same effect as fast-forward.

Various kinds of processing are known as processing for the playback control for video data at a variable viewing speed. Thus, a detailed explanation of the processing is omitted.

The controller 21 detects viewing speeds at time when decoding for data included in a block to be played in the video data (a block of interest) (when the block is an MPEG PES, data of a top frame included in a stream contained in the PES) is performed and time when a data portion corresponding to an end point of the block of interest (when the block is an MPEG PES, for example, data of last one frame included in a stream contained in the PES) is displayed (hereinafter referred to as a start point speed and an end point speed, respectively). It is possible to obtain the viewing speeds as parameters of the processing for the playback control in the controller 21.

One of characteristics in this embodiment is that the controller 21 detects a viewing speed at at least one intermediate point between the start point and the end point of the block of interest (hereinafter referred to as intermediate point speed) and, when the start point speed, the intermediate point speed, and the end point speed satisfy a predetermined condition, judges that viewing of the block of interest is completed, generates viewing information indicating that viewing of the block of interest is completed, and transmits the viewing information to the delivery server 1. The viewing information includes information for specifying the user, information for specifying the video data being played, and information for identifying the block of interest (a block identifier). The information for specifying the user only has to be acquired by authenticating the user using a password or the like in advance.

The predetermined condition may be a condition that the start point speed, the intermediate point speed, and the end point speed are a normal speed, respectively, or a condition that the start point speed, the intermediate point speed, and the end point speed are within a speed range defined in advance, respectively. The latter condition is a condition that all of the start point speed, the intermediate point speed, and the end point speed exceed a lower limit value and are lower than an upper limit value (a predetermined speed in the invention). The upper limit value is set to be, for example, 1.5 times as fast as the normal viewing speed. Parameters for conditions of the lower limit value, the upper limit value, and the like may be defined for each video data. In that case, it is sufficient that the parameters are held for each video data in association with each other and, when the video data is delivered, parameters associated with the video data to be delivered are delivered together with the video data. The controller 21 receives the parameters delivered and uses the parameters.

Processing for viewing information by the controller 11 of the delivery server 1 will be explained. When the delivery server 1 receives viewing information from the video playing apparatus 2, the delivery server 1 accumulates and stores block identifiers included in the viewing information in the viewing information storage unit 14 in association with information for specifying a user and information for specifying video data included in the viewing information (FIG. 4).

The delivery server 1 executes processing for the viewing control operation of a user of the video playing apparatus 2, serving as a client apparatus. For example, the delivery server 1 for users associated with all the block identifiers of video data and lists the users who have viewed the entire video data. Also, the delivery server 1 may calculate the percentage of video data a user has viewed.

The delivery server 1 may accumulate the number of users who have completed viewing for each block (for each macro block including plural continuous blocks), display the number of users of each block (or each macro block), and represent the number of views as a graph. This makes it possible to perform processing for analyzing which part of the entire video data is attracting attention. The number of users accumulated for each block (for each macro block including plural continuous blocks) may be divided by the total number of users who have requested delivery from the delivery server 1 or the total number of users who have requested delivery for each video data to calculate audience rating for each block (for each macro block including plural continuous blocks) and display information on the audience rating calculated.

In the example explained above, the video playing apparatus 2 judges whether viewing of the block has been completed, by using the viewing speeds at the start point, the intermediate point, and the end point. Furthermore, the video playing apparatus 2 may send information on the viewing speeds at the start point, the intermediate point, and the end point of the block to the delivery server 1 and the delivery server 1 judges, on the basis of information on the viewing speeds at the start point, the intermediate point, and the end point received, whether viewing of the block has been completed.

The delivery server 1 does not have to be realized by a single computer and may be a computer system including plural computers. In this case, a computer that delivers video data and a computer that performs processing for viewing management such as reception of viewing information may be separately provided.

According to the video playing system in this embodiment, even when a viewing speed is increased after a user performs playback operation, it is possible to take into account a function of an apparatus on a viewing side. For example, it is judged that viewing has not been performed unless video data is played within a speed range defined as appropriate in advance. It is possible to set a speed range according to a purpose of viewing. For example, a viewing speed up to speed 1.5 times as fast as a normal viewing speed is allowed for a lecture and only a viewing speed equal to the normal viewing speed is allowed for video edition. Consequently, it is possible to make judgment whether video data has been viewed suitable for a purpose of the viewing.

As described above, some embodiments of the invention are outlined below.

A video playing system, which plays video data divided into a plurality of blocks, includes:

a delivery part that delivers video data, a playing part that plays the delivered video data, and a detection part that detects viewing speed of the video data at a start point of a block of interest, at an end point of the block of interest, and at a point between the start point and the end point of the block of interest.

When the detected viewing speed satisfies a predetermined condition, information indicating that viewing for the block is completed is generated. In the video playing system, the generated information may be used for processing for calculation of viewing rating.

The generated information may also be used to calculate how long of video data a user has viewed.

A video playing apparatus that receives video data divided into a plurality of blocks and plays the video data, and when viewing speed of the video data at a start point of a block of interest, at an end point of the block of interest, and at a point between the start point and the end point of the block of interest satisfy a predetermined condition, information indicating that viewing for the block is completed is generated.

The predetermined condition may be a condition that the detected viewing speed for the block of interest is lower than a predetermined speed.

A control method for playing video data which are divided into a plurality of blocks, includes:

playing video data, and generating, when viewing speed of the video data at a start point of a block of interest, at an end point of the block of interest, and at a point between the start point and the end point of the block of interest satisfy a predetermined condition, information indicating that viewing for the block is completed.

A storage medium readable by a computer, the storage medium storing a program of instructions executable by the computer to perform a function for playing video data, the function includes:

playing video data, detecting viewing speed of the video data at a start point of a block of interest, at an end point of the block of interest, and at a point between the start point and the end point of the block of interest, and sending, when the detected viewing speed satisfies a predetermined condition, information indicting that viewing for the block is completed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended to that the scope of the invention be defined by the following claims and their equivalents.

What is claimed is:

1. A video playing system for playing video data divided into a plurality of blocks, the system comprising:

a delivery part that delivers video data;

a playing part that plays the delivered video data;

a detection part that detects instantaneous viewing speed of the video data at only three points, (1) at a start point of a block of interest, (2) at an end point of the block of interest, and (3) at an intermediate point of a block of interest, wherein the intermediate point is between the start point and the end point of the block of interest; said intermediate point is not adjacent to said end point;

a comparison part that compares the detected viewing speed at the start point of the block, the viewing speed at the end point of the block, and the viewing speed at the intermediate point, against a predetermined speed condition and determines if the detected viewing speeds at the three points comply with the predetermined speed condition;

a generating part that generates viewing information indicating whether a user has completed viewing the block of interest when the comparison indicates that the detected viewing speeds at the three points comply with the predetermined condition; and a transmission part that transmits the generated viewing information to the delivery part.

2. The video playing system according to claim 1, wherein the generated information is used for calculating a viewing rating.

3. A video playing apparatus that receives video data divided into a plurality of blocks and plays the video data, comprising:
- a receiving unit that receives said video data;
- a playing unit that plays the received video data;
- a detection unit that detects the instantaneous viewing speed of the video data at only three points, (1) at a start point of a block of interest, (2) at an end point of the block of interest, and (3) at an intermediate point of a block of interest, wherein the intermediate point is between the start point and the end point of the block of interest; said intermediate point is not adjacent to said end point;
- a comparison unit that compares the detected viewing speed at the start point of the block, the viewing speed at the end point of the block, and the viewing speed at the intermediate point, against a predetermined speed condition and determines if the detected viewing speeds at the three points comply with the predetermined condition;
- a generating part that generates viewing information indicating that a user has completed viewing of the block of interest when the comparison indicates that the detected viewing speeds at the three points comply with the predetermined ~condition; and
- a transmission unit that transmits the generated viewing information to a server.

4. The video playing apparatus according to claim 3, wherein the predetermined condition is a condition that the detected viewing speed for the block of interest is lower than a predetermined speed.

5. A control method for playing video data divided into a plurality of blocks, comprising:
- playing said video data;
- detecting the instantaneous viewing speed of the video data at only three points, (1) at a start point of a block of interest, (2) at an end point of the block of interest, and (3) at an intermediate point of the block of interest, wherein the intermediate point is between the start point and the end point of the block of interest; said intermediate point is not adjacent to said end point;
- comparing the viewing speed at the start point of the block, the viewing speed at the end point of the block, and the viewing speed at the intermediate point;
- determining if the detected viewing speeds at the three points comply with the predetermined condition; and
- generating information indicating that a user has completed viewing of the video block when the comparison indicates that the detected viewing speeds at the three points comply with the predetermined speed condition.

6. A tangible storage medium readable by a computer, the storage medium storing a program of instructions executable by the computer to perform a function for playing video data divided into a plurality of blocks, the function comprising:
- playing said video data;
- detecting instantaneous viewing speed of the video data at only three points, (1) at a start point of a block of interest, (2) at an end point of the block of interest, and (3) at an intermediate point of a block of interest, wherein the intermediate point is between the start point and the end point of the block of interest; said intermediate point is not adjacent to said end point;
- comparing the detected viewing speed at the start point of the block, the viewing speed at the end point of the block, and the viewing speed at the intermediate point against a predetermined speed condition;
- determining if the detected viewing speeds at the thee points comply with the predetermined speed condition;
- generating information indicating that a user has completed viewing the block of interest when the comparison indicates that the detected viewing speeds at the three points comply with the predetermined speed condition; and
- sending the generated information indicating that viewing for the block is completed to a server for calculating and displaying information derived from the generated information.

7. The video playing system according to claim 1, wherein the generated information is used to calculate how long of video data a user has viewed.

8. The video playing system according to claim 1, wherein the viewing information indicates whether the user has successfully completed viewing the video block.

9. The video playing system according to claim 1, wherein the predetermined speed condition is a normal playing speed.

10. A video playing system for playing video data divided into a plurality of blocks, the system comprising:
- a delivery part that delivers said video data;
- a playing part that plays the delivered video data;
- a detection part that detects instantaneous viewing speed of the video data at only three points, (1) at a start point of a block of interest, (2) at an end point of the block of interest, and (3) at an intermediate point of the block of interest, wherein the intermediate point is between the start point and the end point of the block of interest; said intermediate point is not adjacent to said end point;
- a transmission part that transmits the detected viewing speed of video data at the start point, at the end point, and the intermediated point of the video data, to the delivery part,
- a comparison part that compares the transmitted viewing speed at the start point, the end point, and the intermediate point of the block against a predetermined speed condition;
- a generating part that generates viewing information indicating whether a user has viewed the video data, based on the comparison result.

11. A video playing system for playing video data divided into a plurality of blocks, the system comprising:
- a delivery part that delivers said video data;
- a playing part that plays the delivered video data; a detection part that detects instantaneous viewing speed of the video data at only three points, (1) at a start point of a block of interest, (2) at an end point of the block of interest, and (3) at an intermediate point of the block of interest, wherein the intermediate point is between the start point and the end point of the block of interest; said intermediate point is not adjacent to said end point;
- a comparison part that compares the detected viewing speed at the start point, the end point, and the intermediate point of the block against a predetermined speed condition;
- a transmission part that transmits the comparison result to the delivery part;
- a generating part that generates viewing information indicating whether a user has viewed the video block based on the transmitted comparison result.

12. A video playing system comprising:
- a delivery part that delivers video data;
- a playing part that plays the delivered video data;
- a detection part that detects instantaneous viewing speed of the video data at only three points, (1) at a start point, (2)

at an end point, and (3) at an intermediate point between the start point and the end point; said intermediate point is not adjacent to said end point;

a transmission part that transmits the detected viewing speed of the video data at a start point, at an end point, and at an intermediate point to the delivery part; and a comparison part that compares the transmitted viewing speed at the start point, the viewing speed at the end point, and the viewing speed at the intermediate point against a predetermined speed condition;

a generating part that generates viewing information indicating viewership of the video data, based on the comparison result.

13. A video playing system comprising:

a delivery part that delivers video data;

a playing part that plays the delivered video data;

a detection part that detects the instantaneous viewing speed of the video data at only three points, (1) at a start point, (2) at an end point, and (3) at an intermediate point between the start point and the end point; said intermediate point is not adjacent to said end point;

a comparison part that compares the detected viewing speed at the start point, the viewing speed at the end point, and the viewing speed at the intermediate point against a predetermined speed condition;

a transmission part that transmits the comparison result to the delivery part; and a generating part that generates viewing information indicating viewership of the video data, based on the transmitted comparison result.

14. A control method claim corresponding to claim 10.

15. A control method claim corresponding to claim 11.

16. A control method claim corresponding to claim 12.

17. A control method claim corresponding to claim 13.

18. A tangible storage medium containing machine-readable codes that, when executed by a computer, performs steps corresponding to claim 10.

19. A tangible storage medium containing machine-readable codes that, when executed by a computer, performs steps corresponding to claim 11.

20. A tangible storage medium containing machine-readable codes that, when executed by a computer, performs steps corresponding to claim 12.

21. A tangible storage medium containing machine-readable codes that, when executed by a computer, performs steps corresponding to claim 13.

* * * * *